United States Patent [19]

Chalupsky et al.

[11] 4,340,362
[45] Jul. 20, 1982

[54] FUEL FLOW MEANS FOR PORTABLE SPACE HEATERS

[75] Inventors: Clayton W. Chalupsky; David A. Clemen, both of Cedar Rapids, Iowa

[73] Assignee: Ex-Cell-O Corporation, Troy, Mich.

[21] Appl. No.: 237,329

[22] Filed: Feb. 23, 1981

[51] Int. Cl.³ .......................... F24H 1/00; F23D 15/02
[52] U.S. Cl. ...................................... 432/222; 431/353
[58] Field of Search ......................... 432/222; 431/353

[56] References Cited

U.S. PATENT DOCUMENTS

| | | | |
|---|---|---|---|
| 2,994,520 | 8/1961 | Sherman | 432/222 |
| 4,081,238 | 3/1978 | Briggs et al. | 432/222 |
| 4,201,544 | 5/1980 | Briggs et al. | 432/222 |
| 4,313,417 | 2/1982 | Briggs et al. | 432/222 |

Primary Examiner—John J. Camby
Attorney, Agent, or Firm—Frank D. Risko; John C. Evans

[57] ABSTRACT

A portable space heater having a deep fuel tank in conjunction with a fuel pump for raising the fuel to a predetermined height to feed an aspirating type nozzle incorporated in the fuel system and an adjusting valve means to control the flow of fuel to the siphon line connected to the nozzle. The fuel pump feeds the fuel from the tank to a predetermined level at which the aspirating nozzle will operate efficiently. The fuel line system also has a return line to the tank which allows any excess fuel in the lines to be appropriately returned to the tank.

6 Claims, 1 Drawing Figure

U.S. Patent
Jul. 20, 1982
4,340,362
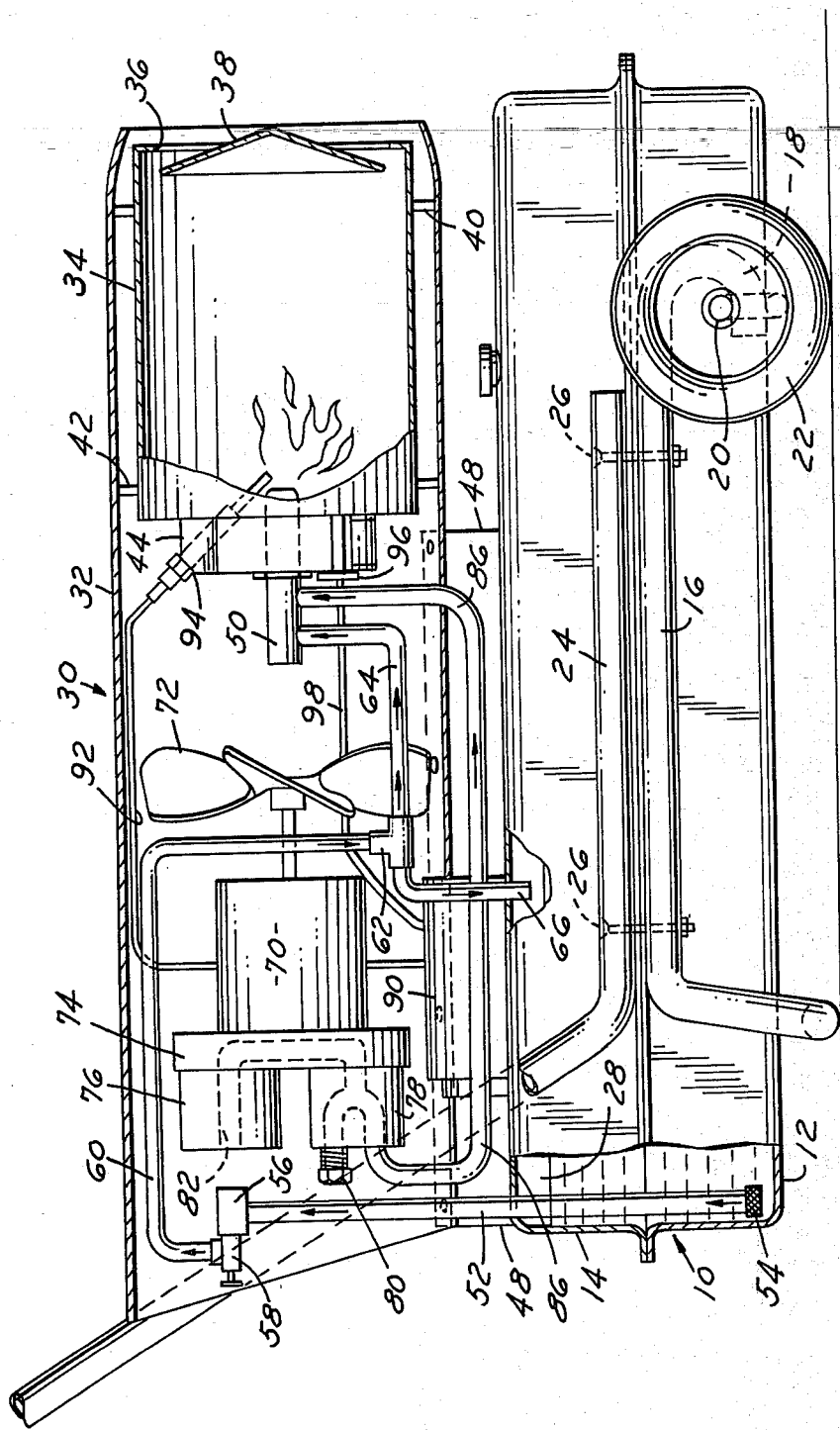

FUEL FLOW MEANS FOR PORTABLE SPACE HEATERS

BACKGROUND OF INVENTION

This invention relates to portable space heaters having a deep tank and more particularly to the novel method and apparatus used for transfer of fuel from the tank to the burner nozzle and the return of excess fuel to the tank.

Many types of space heaters have been and are available in the prior art which are designed having two common methods for metering and atomizing the fuel oil in the burner of an oil fired heater. In one type system, fuel oil can be supplied to a nozzle by a fuel pump having a pressure regulator in the line to regulate the nozzle pressures and will operate at approximately 100 psi. In the relatively small type portable heater that is operating in the range of from 30 to 60,000 BTU's, the disadvantage of a fuel pump is the high cost of the pump, for a low priced unit, and the tendency for the nozzle of a unit having a pump to dribble oil into the combustion chamber after the pump and the combustion air fan have been stopped. This dribbling of oil into the hot combustion chamber will cause smoke and an odor from the noxious gas formed from the unburned fuel. It should be noted that steps are taken to prevent such occurrence. This type of fuel pump is shown in U.S. Pat. No. 3,794,461 to Brazee.

The other popular method of supplying oil to the burner of the combustion chamber of a portable heater is through the use of an air aspirating nozzle. Compressed air is metered through the nozzle from a small carbon vane type air compressor. This air compressor delivers the air to the nozzle at approximately 5 psi. As the air passes through the nozzle, a second connection from the nozzle passage is made to the fuel tank below the nozzle. This will cause the oil to be pulled up or drawn into the nozzle where it is then atomized by the air passing through the nozzle and fed into the combustion chamber. This method of metering and atomizing the oil is relatively low in cost and eliminates the problem of oil dripping into the combustion chamber on shut down. However, there are some limitations to the use of this type nozzle system. The fuel flow rate and hence the heat generated by the unit is very sensitive to the depth of the fuel in the tank and the distance between the nozzle per se and the fuel inlet tube opening. Therefore, it has been necessary until now to use only shallow tanks with an air aspirating type nozzle so that the firing rate could be relatively constant as the level of the fuel in the tank is reduced to prevent a substantial change in the oil head. The need for a shallow tank ultimately limits the maximum size of the portable heater's fuel capacity and in general has limited the firing rate to approximately 1.1 gallons per hour. Also, nozzles having an aspirating rate greater than 1.1 gallons per hour are even more limited as to their ability to aspirate liquid with the limited amount of air available from the air compressor on the heater. At 1.6 gallons per hour the ability to lift fuel from the tank is limited to approximately 5½ inches. It would therefore be physically impossible to supply oil in a shallow tank and have an oil reservoir or tank equivalent to 12 or more hours of continuous operation. The application of this type heater can be on a building construction site or in a farm building. An aspirating type nozzle and a unit having a shallow tank is described in U.S. Pat. No. 4,081,238 issued to Briggs et al.

In view of the above discussion, it is the principle object of this invention to provide a space heater incorporating both an inexpensive positive displacement fuel pump and valve means in conjunction with an aspirating type air nozzle for use on a deep tank type fuel container. Another object of the invention is to raise the fuel from the tank to a particular predetermining heighth in conjunction with the aspirating nozzle. A further object of this invention is to provide an additional path for excess fuel to flow back into the tank. A further object of this invention is to limit the pressure of the fuel in the line from the positive displacement pump so as not to allow excess fuel to be available at the nozzle orifice when the unit is shut down. Another object of this invention is to use the aspirating nozzle principle for bringing fuel from the fuel pump line into the combustion chamber and atomize the fuel for proper combustion.

Another object of the invention is to provide a solenoid operated fuel pump in conjunction with an adjusting valve means to control the pressure and flow of fuel to the nozzle. Another object of this invention is to provide a connection from the fuel line directly to the fuel tank to prevent excess flow of fuel to the nozzle means. Other objects will become apparent to those skilled in the art upon review of this invention and upon reading the description of the preferred embodiment and viewing the accompanying drawing.

SUMMARY OF THE INVENTION

In accordance with the specification and drawings, the invention generally stated is a space heater designed to provide better efficiency and longer term operation and in particular the use of a deep tank and fuel supply system for smaller sized portable heaters which improves upon related heaters disclosed in the prior art. The better efficiency of operation is attained by the addition of a fuel pump in the fuel line system to raise the level of the fuel to a predetermined point in that system whereby an air operated aspirating nozzle can then pull or siphon the required amount of fuel into the combustion chamber where it is vaporized, ignited and burned to produce the desired heating. The fuel line leading to the air aspirating nozzle is provided with a tee which allows excess oil not needed for the operation of the unit to be returned to the tank. The addition of the fuel pump overcomes the restriction which is caused by just using the air aspirating nozzle alone. In other words, the volume of oil required by the heater cannot be attained by the action of an air aspirating nozzle by itself. In addition to the fuel pump, a valve is provided at the fuel pump outlet so that the heating or BTU range of the unit can be adjusted. If more heat is desired, it is simply necessary to adjust this valve and allow the air aspirating nozzle to pull more fuel into the combustion chamber. If it is desired to reduce the amount of heat, this valve can be adjusted to achieve that effect as well.

This fuel system is to be incorporated in a 225,000 BTU space heater for commercial manufacture. However, there is no reason that it could not be utilized in lower BTU units, that is, units which are or have a maximum capacity in the range of 30 to 150,000 BTU's. Therefore, a deep tank can be installed on a smaller sized unit with this fuel line system invention thereby giving a much more efficient unit having a longer operating period. The size of the fuel tanks will vary from two to eight gallons in the smaller sized units. With my invention the size of the tanks can now be almost doubled, that is, they can be increased to approximately 12 or 16 gallon tanks to five continuous operation over a long period of time.

It should be noted that there are many elements in a space heater which make up part of the mechanical structure and the electrical control system. These will not be described in detail in this specification because they are reasonably standard and straightforward in most portable heaters of this type. The and design combination of the pump, deep tank and aspirating nozzle could be used in other heater fields as well.

DRAWING

In the drawing provided is shown a partial cross-sectional and perspective view of the basic elements of the space heater showing the relatively important components of the system making up this invention.

DESCRIPTION OF THE PREFERRED EMBODIMENT

In the drawing is shown a perspective view of the space heater containing the invention. A tank assembly 10 is shown consisting of lower tank 12 and upper tank 14 meeting in a flange between the two sections which is normally spot welded or seam welded forming an integral assembly. A lower ground support 16 is shown along the lower edge of the flange of lower tank 12. This support has a curved end 18, on one end whereby an axle 20 is attached to a wheel 22 and on the other end is in ground contact and supports the left hand end of the tank. The axle 20 could be affixed to a plate and extend out from one side of the tank with another axle and wheel on the opposite side. However, it is also obvious that the axle assembly affixed to the end 18 could be curved down and passed below the one end of lower tank 12 and support the tank as well with a wheel on the opposite end. A handle 24 is supported on the flange of upper tank 14 and is affixed to the ground support 16 by fastener 26 or any other convenient means of assembly. The combustion chamber means 30 comprises the heart of the heater unit. This consists in simplified form of a tubular structure or outer shell 32 with openings at both ends having a combustion chamber 34 contained inside the outer shell 32 and mounted toward one end and supported by support means 40 and 42 approximately equidistance from the outer shell 32. Opening 36 the outlet at one end of the combustion chamber 34 is fitted with a conical shaped cone 38 supported therein which traps and causes secondary combustion of the volitized admixture of fuel and air and prevents flames from shooting directly out the end of combustion chamber means 30. A burner means 44 mounted to one end of combustion chamber 34 has a series of openings around the periphery of the burner which will cause the air to swirl as it enters the combustion chamber 34. Into the burner means 44 is connected the ignitor, nozzle and safety cell which will be described in detail later. The combustion chamber means 30 is supported from the tank assembly means 10 by combustion chamber support means 48. This support 48 consists of a simple U-shaped structure having flared top edges which are affixed to the shell 32. The bottom of the structure is affixed to the top or upper tank half 14 for supporting the combustion chamber over the whole tank per se. Any convenient means for attaching the support 48 to shell 32 would be used, for example, pop rivets, bolts or sheet metal screws. The U-shaped structure would be welded to tank half 14 to maintain the integrity of the tank 10. It should be pointed out that shell 32 can be comprised of two halves, semi-circular in shape so that the lower portion of shell 32 can be affixed permanently to the support means 48 and hence to tank 10 and the upper half of shell 32 could be removed for convenience of trouble shooting and maintenance of the unit. Nozzle means 50 is affixed to burner 44 by any convenient means.

The fuel system comprises fuel lift tube 52 which extends down into tank 10 having a fuel filter 54 at the inlet end. The upper end of fuel lift tube 52 is connected to fuel pump means 56 which can be a simple solenoid operated fuel pump or can be a more sophisticated gear pump, star wheel or gerotor pump, or any of a number of fuel pump means. Connected at the outlet of fuel pump 56 is fuel adjusting valve 58 which controls the flow of fluid through the fuel system. Intermediate fuel line 60 is connected from the outlet of adjusting valve 58 to a tee fitting 62 which branches into fuel nozzle input line 64 and fuel return line 66. The fuel nozzle input or siphon line 64 feeds directly into the nozzle 50. The other end of the fuel line coming out of tee fitting 62 feeds fuel return line 66 into the tank 10. Although the lines are shown in the figure physically separated, it would not be an absolute requirement and they could be juxtaposed with each other. Appropriate fittings and seals (not shown) would be used around both fuel return line 66 and fuel lift tube means 52. The fuel return line 66 shown just engaging air space 28 in tank 10 could extend farther into the tank. However, this might tend to stir up any sediment which would tend to settle out toward the bottom of the lower tank 12 and therefore returning the fuel at the higher level would be in keeping with good practice not to excessively stir up the fuel tank contents and allow any entrapped air to settle out as well. The electric motor 70 is shown connecting to fan blade 72 on one end and a compressor 74 on the other end. In these type heater units, this combination is quite normal and prevalent. The fan will push air toward and around the combustion chamber 34 with some air directed via the burner 44 inside the combustion chamber to admix fuel and air for proper combustion. The compressor has both an inlet means 76, which can contain an inlet air filter, and an outlet means 78 which also can contain a filter means. The more important filter is the outlet filter which keeps the nozzle from getting plugged up or fouled. The output of compressor 74 is adjusted by means of relief valve 80 which controls the pressure to the air line 86. It can be seen in the figure that air would enter opening 82, pass through compressor body 74, and flow through air line 86, controlled by relief valve 80, to the aspirating nozzle means 50. Sitting just below motor 70 is a transformer and electrical control means 90 having an ignitor wire 92 coming therefrom to ignitor 94. The ignitor 94 can be a spark plug or other means of electrically producing a spark in the combustion chamber whereby the atomized gas or fuel is ignited. The spark plug or ignitor 94 is shown affixedly held to burner means 44. From the lower end of burner means 44 is a cad cell or flame detector 96 which is connected via wire 98 back to control means 90. The purpose of the cad cell is to detect the lack of a flame in the combustion chamber. This is in the event of a flame out during normal operation or in the event the unit will not start. If the cad cell detects such a condition, it will develop a signal into the control means which will disconnect the input electrical power and the whole unit will shut down. Such control systems utilizing a cad cell, an electrical disconnect and a spark plug or ignitor system for igniting the fuel in the combustion chamber are well known in the art of portable space heaters and will not be discussed further.

OPERATION

Referring now to the drawing, the operation of the invention as used in a portable space heater will be described. Upon connection of the system to an electrical line, the electric motor 70 will begin operating which will cause fan 72, the compressor unit 74 and the fuel pump 56 to begin operating. The fan will blow air into the combustion chamber via burner means 44 and will also cause air to pass between the shell 32 and combustion chamber 34 and exit out the right hand side of the combustion chamber means 30. The compressor means via air line 86 will supply air to the aspirating nozzle means 50 which will then start drawing fuel through siphon line 64. The fuel pump 56 will bring fuel through lift tube 52 after it is filtered from the tank means 10 and pass it through adjusting valve 58 into line 60 which carries the fuel to tee fitting 62. The flow and pressure that will be developed by the solenoid operated fuel pump 56 will be sufficient to raise the fuel to the level or heighth needed for the aspirating nozzle means 50 in conjunction with siphon line 64 to operate properly. A tee fitting 62 connected to line 60 will return, by line 66, any excess fuel that is not needed or required by the aspirating nozzle means 50. At the same time the electrical power is supplied to the motor and fuel pump, it will also be supplied to the transformer and electrical control means 90. The transformer and control means 90 will provide a high voltage signal or potential to the ignitor 94 which will produce a continuous spark across its gap causing the fuel-air mixture to ignite. If a flame is not properly detected within a reasonable time, for example, 15 seconds, the cad cell 96 will sense the absence of a flame and will turn the unit off requiring a restart cycle to be initiated. If the ignitor does ignite the atomized fuel in combustion chamber 34 and a normal flame is produced, the cad cell will allow the unit to continue operating. In normal and proper operation, almost all of the fuel flowing through fuel line 60 will flow through siphon line 64 and into the aspirating nozzle 50 in order to achieve the proper operation at the correct BTU level which is desired. That is, the aspirating nozzle will take all the fuel available at the inlet to the siphon tube 64 and very little will actually be returned to tank 10. If a higher temperature or a greater quantity of heat is desired, it is a simple procedure to adjust the control valve 58 at the outlet of fuel pump 56 and a greater quantity of fuel will be allowed to flow through fuel line 60, siphon line 64 and into the aspirating nozzle 50. If it is desired to reduce the amount of heat required or needed, it is simply a matter of readjusting valve 58 to reduce the quantity of fuel flowing in line 60 and 64 to the aspirating nozzle. In normal operation, it will also be necessary to properly adjust the pressure and hence the air flow through line 86 by relief valve 80 in the compressor outlet 78. Although not shown in detail in conjunction with nozzle means 50, there is a third adjustment of the nozzle itself and the position of the tip with respect to the burner that can be made to control the proper burning of the fuel. These initial adjustments (air pressure and nozzle adjustment) are normally factory set and generally not necessary.

Complete combustion, however, is necessary so that no odor or noxious gases will eminate from the unit.

Upon shutdown of the unit, the electrical power will be disconnected immediately causing the fan and compressor to slow down and stop and the fuel pump 56 to stop. The feature of the aspirating nozzle and a fuel pump is a unique combination which allows the user the advantage of a deep tank, or much larger reservoir than normally would be provided in the smaller type portable heaters and at the same time gives the added advantage of not having noxious fumes formed upon shutdown because of excess oil dripping into the combustion chamber as with high pressure systems.

In summary, my invention in the preferred embodiment comprises a fuel system as used in a portable space heater having a fuel pump, that can be solenoid operated, providing the proper amount of fuel through an adjustable valve means and into a line which connects to an aspirating type fuel nozzle with a return line to the tank. The aspirating fuel nozzle includes an air line which is fed from a compressor means for the purpose of siphoning fuel from the fuel line into the combustion chamber. That fuel is atomized by the nozzle and in conjunction with air blown through the burner assembly is mixed into the proper air fuel mixture whereby it is then ignited in the combustion chamber. This ignition is sustained by an electrical control circuit so that the heater will produce the desired amount of heat required by the user. A further embodiment contains a valve means for adjusting the flow of fluid to the siphon line of the aspirating nozzle means. A check valve means could alternatively be put into the output line of the fuel pump as a means to stop shutdown flow in the fuel lines. It is obvious that numerous variations and adaptations of the fuel pump, aspirating nozzle, valves and fuel line means can be made in the art presented here. It is anticipated that any such changes are within the scope of the appended claims which may occur to those skilled in this art in light of the foregoing specification. The described disclosure is illustrative of the principle of the invention.

I claim:

1. A space heater apparatus having a fuel tank and support means, a combustion chamber means supported above said tank means including a combustion chamber, burner means, an aspirating nozzle means having a syphon line, motor driven fan, an air compressor and air line means connected to said nozzle means, an electrical control means and a fuel supply means wherein the improvement comprises
   (a) a lift pipe means connecting fuel in said fuel tank, first stage pump means operative to supply a low pressure head of fuel to said aspirating nozzle means;
   (b) valve means for adjusting the flow of fuel in said fuel system;
   (c) fuel system means including said first stage pump means and a continuously open tank return fuel line in communication with said fuel tank and said aspirating nozzle to establish a pressure head source in communication with said syphon line for directing fuel to said aspirating nozzle means and wherein excess fuel is returned to said tank means;
   (d) said aspirating nozzle defining second stage pump means for drawing fuel from said low pressure source to produce a second stage pressure boost for supplying fuel under pressure to said combustion chamber.

2. The apparatus of claim 1 wherein said first stage pump means is a pump having an inlet connected to said lift pipe means and an outlet connected to said means for adjusting the flow of fluid in said fuel system.

3. The apparatus of claim 2 wherein said valve means for adjusting the flow of fluid in said fuel system is a needle valve with an outlet simultaneously and continuously connected to said nozzle means syphon line and to said continuously open tank return fuel line and operative to control the quantity of fuel flow to the low pressure head source in accordance with combustion chamber heat output.

4. The apparatus of claim 3 wherein said tank means includes upper and lower tank portions forming a deep tank having a filled fuel depth of at least 3½ inches and said lift pipe means has an inlet located closely adjacent the bottom of said deep tank.

5. A space heating apparatus having a fuel supply system especially adapted for deep tanks comprising first stage pump means having an inlet and an outlet, a pipe and filter means for connecting fuel in a tank means to the inlet of said first stage fuel pump means, valve means connected to the outlet of said first stage fuel pump means for controlling the flow of fuel from said pump, the outlet of said valve means connected to branch means including a tee fitting having two outlets, a siphon pipe means connected to one of said tee fitting outlets, a return line means, the other of said tee fitting outlets connected to said return line means continuously open to a tank for returning excess fuel to the tank, aspirator pump nozzle means connected to said siphon pipe means, said aspirator pump nozzle means having an air compressor means connected thereto and means whereby the air passing through said nozzle means will aspirate fuel from said siphon line to produce a second stage pressurization of fuel to be atomized and sprayed in a combustion chamber for burning therein.

6. The apparatus of claim 5 wherein said fuel pump means is a pump having an outlet, said valve means being a needle valve connected to said pump outlet which controls the amount of fuel flowing to said siphon line connected to the aspirating pump nozzle means.

* * * * *